(12) United States Patent
Cheek

(10) Patent No.: US 10,548,792 B2
(45) Date of Patent: Feb. 4, 2020

(54) MOTORIZED CHAIR

(71) Applicant: Larry Nelson Cheek, Ullin, IL (US)

(72) Inventor: Larry Nelson Cheek, Ullin, IL (US)

( * ) Notice: Subject to any disclaimer, the term of this patent is extended or adjusted under 35 U.S.C. 154(b) by 265 days.

(21) Appl. No.: 15/421,973

(22) Filed: Feb. 1, 2017

(65) Prior Publication Data

US 2018/0214328 A1 Aug. 2, 2018

(51) Int. Cl.
*A61G 5/14* (2006.01)
*A61G 7/10* (2006.01)
*A61G 5/10* (2006.01)
*A61G 5/04* (2013.01)

(52) U.S. Cl.
CPC ............ *A61G 7/1001* (2013.01); *A61G 5/10* (2013.01); *A61G 5/14* (2013.01); *A61G 7/1015* (2013.01); *A61G 7/1046* (2013.01); *A61G 7/1051* (2013.01); *A61G 7/1065* (2013.01); *A61G 5/04* (2013.01); *A61G 2203/30* (2013.01); *B60Y 2200/84* (2013.01)

(58) Field of Classification Search
CPC ............................... A61G 7/1017; A61G 7/053
See application file for complete search history.

(56) References Cited

U.S. PATENT DOCUMENTS

| | | | | |
|---|---|---|---|---|
| 4,606,082 A * | 8/1986 | Kuhlman | ................. | A61G 5/00 280/304.1 |
| 4,999,862 A * | 3/1991 | Hefty | ...................... | A61G 5/10 280/304.1 |
| 5,096,008 A * | 3/1992 | Mankowski | ........... | A61G 5/042 180/6.5 |
| 5,165,123 A * | 11/1992 | Colpron | .................... | A61G 5/10 254/326 |
| 5,388,289 A * | 2/1995 | Casperson | ............... | A61G 5/00 280/250.1 |
| 5,409,250 A * | 4/1995 | Csotonyi | ................ | A61G 5/042 180/6.2 |
| 5,651,149 A * | 7/1997 | Garman | ............... | A61G 5/1059 414/921 |
| 6,959,940 B2 * | 11/2005 | Perena | ..................... | A61G 5/10 280/250.1 |
| 8,966,678 B2 * | 3/2015 | Jessen | .................. | A61G 7/1019 5/81.1 R |

* cited by examiner

*Primary Examiner* — Sarah B McPartlin
(74) *Attorney, Agent, or Firm* — Creativenture Law, LLC; Dennis J M Donahue, III; Kevin C. Staed

(57) ABSTRACT

A motorized chair is provided. The chair comprises a seat, a back, a hoist comprising at least a mast, a winch, and a sling, and at least one actuator, that based on receipt of a first instruction to activate the hoist, raises the seat and back and extends the mast over the raised seat and back. Based on receipt of a second instruction, the at least one actuator instructs the winch to raise the sling. An individual seated in the chair, based on actuator receipt of the first instruction, is raised to an upright position. The sling comprises at least one member for attachment to the individual. Based on the attachment of the at least one member to the individual and based on receipt of the second instruction by the at least one actuator, the hoist lifts the individual.

20 Claims, 5 Drawing Sheets

MOTORIZED CHAIR

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to mobility aids. More particularly, the invention relates to a mobility aiding chair with an integrated patient hoist.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon. Many individuals with mobility issues due to various causes such as, but not limited to, age, accidents, or medical conditions, may use wheelchairs or motorized chairs to improve their mobility. In some instances, these individuals may have difficulty getting into and out of such chairs even with the help of a caregiver. For example, without limitation, an individual that has little to no use of his or her legs may have difficulty transferring himself from a bed to the chair or vice versa. Furthermore, a caregiver may not have the strength to lift the individual from the bed to transfer the individual to the chair or vice versa. In addition, if an individual with mobility issues falls, it may be difficult or impossible for the individual to safely get back into bed or the chair with or without caregiver assistance.

By way of educational background, the prior art teaches some apparatus for assisting an individual into or out of a wheelchair or motorized chair. One such apparatus may provide a motorized wheelchair that elevates an occupant from a sitting position to any position up to a normal standing position. Such approaches may not provide means for moving the occupant to another location, for example without limitation to a bed, once the occupant is in a standing position. Other approaches may provide power lifts or manual lifts. These lifts typically comprise a sling which may be attached to an individual connected to a hoist to lift the individual and move the individual from one location to another. These lifts are often large and heavy and may be difficult to maneuver. Some facilities may require two caregivers to operate such lifts as maneuvering the weight of the lift and an onboard patient after lifting may be too strenuous for one individual. The size and weight of these lifts may result in difficulty in transporting the lifts particularly if the ground surface is not smooth and level, for example without limitation, up or down a ramp or across carpeted surfaces. Such approaches may cause discomfort to the individual being transported by the lift. For example, without limitation, the sling may exert uncomfortable pressure on various portions of the individual's body. Yet other approaches may provide overhead rail systems. Such approaches may have limited flexibility since their use may typically be limited to areas in which rails have been installed.

In view of the foregoing, it is clear that these traditional techniques leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a transparent front view of the sling. FIG. 2B is a diagrammatic front view of a cam plate. FIG. 2C is an exploded front view of a lower portion of the sling with a retractable safety strap, and FIG. 2D is a transparent side view of the lower portion of the sling with the retractable safety strap;

FIG. 3A is a diagrammatic side view, and FIG. 3B is a diagrammatic front view;

Figure 1:
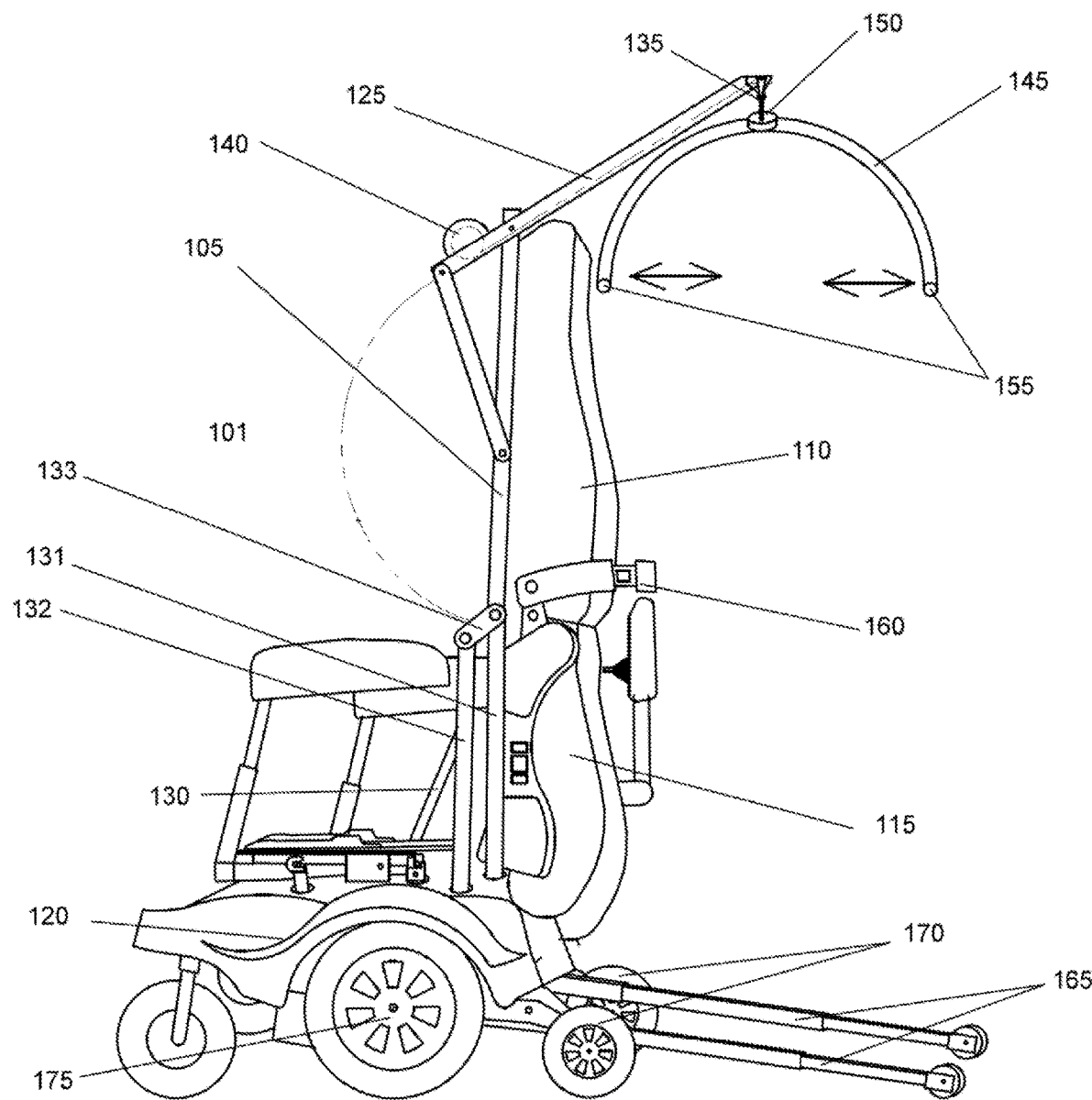
FIG. 1 is a side perspective view of an exemplary motorized chair with an attached hoist, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). The ordinary meaning of "substantially halfway" is thus reasonably close to or nearly at the midpoint between the forwardmost point of the upper or outsole and the rearwardmost point of the upper or outsole.

Similarly, the term "substantially" is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform'. The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, see, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to avoid a strict numerical boundary to the specified parameter," see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, are generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . " Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of," and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s)

of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

One embodiment of the present invention may provide a motorized wheel chair with an integrated hoist. Some embodiments may combine a motorized wheelchair and a patient hoist into one object, which may be able to perform the various functions that may be accomplished individually by each object. These functions may include, without limitation, lifting and transporting individual with mobility limitations.

FIG. 1 is a side perspective view of an exemplary motorized chair 101 with an attached hoist 105, in accordance with an embodiment of the present invention. In the present embodiment, motorized chair 101 may comprise means for raising a back 110 and a seat 115 into a substantially vertical position, as illustrated by way of example in FIG. 1. When back 110 and seat 115 are raised, hoist 105 extends from a base 120 of chair 101. Hoist 105 may comprise a mast 125 that may extend up and out to the front of seat 115. A movable linkage 130 comprising two parallel bars 131 and 132 and a connecting bar 133 may connect hoist 105 to chair base 120. The moveable linkage 130 may be power adjustable to enable hoist 105 to be raised and lowered along with back 110 and seat 115. Movable linkage 130 may also retract and fold into chair 101 when back 110 and seat 115 are lowered to provide a low profile. It may be beneficial for back 110 to be somewhat tall to create more area for the storage of hoist 105. The function of raising back 110 and seat 115 by linkage 130 may be powered by multiple actuators. These actuators may be attached to one or both of parallel bars 131 and 132. In some embodiments the actuators may perform different functions. For example, without limitation, an actuator attached to parallel bar 131 may be able to lift hoist 105, back 110, and seat 115 into a raised position while an actuator which may be capable of tilting the back 110 forward or backward into a reclining position may be attached to parallel bar 132. The actuators may be powered by battery operated motors which may have their own batteries or may use power from the same batteries which operate the power chair 101. The motors incorporated into the actuators may turn gears that power threaded shafts that may extend and retract the actuators. In some embodiments the ratio of the number of revolutions of the motors powering the actuators compared to the number of revolutions of the threaded shafts may be calibrated to help ensure that the actuators are powerful enough to move the loads that the actuators are expected to move and that the actuators typically have the capability to hold the same load in any position in which the load is stopped. Linkage 130 may also modify the tilt of the back 110. For example, without limitation, when in an upright position, linkage 130 may enable back 110 to be tilted forward to extend the outward reach of mast 125 or to lower mast 125 towards the floor. In addition, when back 110 and seat 115 are lowered, linkage 130 may enable back 110 to tilt backward into a reclining position. In some embodiments the mechanism that performs the seat raising function may comprise two linkages with each linkage being slightly off of center or all the way to each outside edge of the chair. It is contemplated that other alternate embodiments may be implemented in which the seat and back may not be able to be raised to an upright position. In these embodiments, the hoist may be attached to the base of the chair with a single hinged connection point or with a rigid connection point.

In the present embodiment, a winch line 135 may be attached to a winch 140 near the base of mast 125. Winch line 135 may be long enough to extend to floor level. Winch line 135 may travel inside mast 125, and the interior of mast 125 may be constructed to typically prevent fraying of winch line 135. It is contemplated that winch line 125 may be made of a multiplicity of suitable materials including, without limitation, woven straps, plastic straps, metal cable, rope, chain, etc. Straps may be a desirable option as straps may be less apt to twist while winding on the spool of winch 140. In some alternate embodiments, the winch line 135 may travel along the outside of the mast 125. In the present embodiment, winch 140 supplies the action of extending and retracting winch line 135 to lift or lower an individual. Winch 135 is typically motorized. However, there may be some instances in which winch 135 may be manually powered. For example, without limitation, in the case of a malfunction of the power source winch 135 may be manually operated to lower an individual for emergency purposes. A sling 145 may be attached to the end of winch line 135 opposite winch 140 to provide a connection point to the individual to be lifted. Sling 145 may be connected to winch line 135 so that sling 145 may freely rotate 360 degrees or more using various different types of connections including, without limitation, ball and socket joints or swivel joints. Sling 145 may comprise a hinge 150 near the connection to winch line 135 which may enable the width of sling 145 to be widened or narrowed to accommodate individuals of different sizes. Sling 145 may comprise a horizontal member 155 at each end which an individual may place under his armpits in order to be lifted by sling 145. In some embodiments these horizontal members 155 may be padded for comfort. In some embodiments these lifting members may have various different shapes including, but not limited to, hooks, flat plates, balls, etc. Those skilled in the art will readily recognize, in light of and in accordance with the teachings of the present invention, that various different types of slings or positioning devices may be used in other embodiments such as, but not limited to, slings made of straps or fabric, belt type positioning devices, devices that the individual being lifted may grip with his hands, etc. For example, without limitation, sling devices may be as simple as a piece of fabric with attached straps which may surround the patient and connect to a lifting point. Such slings and positioning devices may be constructed of many different materials, such as, but not limited to, plastic, steel, other metals, wood, fiberglass, etc. In some embodiments, the sling or other device for connecting an individual to the hoist may be designed so that the individual may attach the sling by himself. In other embodiments the sling may be designed so that a caregiver may need to help the individual connect to the sling. In the present embodiment, sling 145 may be stored on or incorporated into back 110. This may enable sling 145 to remain available and in position. It is contemplated that in some embodiments, sling 145 may be removed from chair 101 when not in use. Furthermore, in some embodiments, when removed from chair 101, sling 145 may be used on other devices such as, but not limited to, stand-alone lifts or overhead rail systems.

In the present embodiment, chair 101 may comprise multiple safety devices. For example, without limitation, one or more straps 160 may be provided to secure the individual to back 110 and/or seat 115. In addition, in some embodiments, straps may be provided to secure the individual to sling 145. In some embodiments the safety straps on the sling 145 may be able to retract similar to a seatbelt in an automobile so that the straps may be in a secure and unobtrusive place when not in use rather than hanging loose where the straps may become tangled with each other, an individual or other equipment. It is contemplated that there may be a multiplicity of suitable locations on sling 145 where it may be beneficial to attach this type of safety strap. For example, without limitation, in one embodiment a retractable strap may be connected to one of horizontal members 155. This strap may comprise a buckle or other type of connector that may enable the strap to be pulled from the retracted position and attached to the other horizontal member 155. This may typically cause the strap to be secured around the chest of the individual connected to sling 145. In another embodiment, a strap may be used that would surround the patient near the elbows to typically ensure that the patient's arms do not raise upward as the patient is being lifted to help prevent the patient from slipping out of the sling. This strap would probably not be attached to the sling since, while the sling is positioned upon the patient, most of the sling would be above the point of the arms which may benefit from this support. In the present embodiment, one or more level sensors may be incorporated into chair 101 to warn of unsafe operation and possibly lock out powered operations if warning is not heeded. These level sensors may return power to the lifting operation once the levelness is within a safe perimeter.

It is contemplated that chair 101 may comprise some structural reinforcements to compensate for the load demands which may be placed upon chair 101 from the lifting of an individual. Some such reinforcements may include, without limitation, a sturdy base structure capable of supporting such stresses, materials of an appropriate gauge or density to support such stresses, reinforcing frames within the cushioning of seat and back, etc. In addition, one or more outriggers 165 may extend from base 120. In the present embodiment, outriggers 165 may provide stability to chair 101 during the lifting of an individual on sling 145 to help prevent chair 101 from becoming unstable and tipping forward. Because of this added stability, outriggers 165 may also increase the lifting capacity of chair 101. Outriggers 165 may be attached to the underneath frame of base 120 and may extend a small distance beyond the center of the load being lifted. In addition, safety wheels 170 may be included, without limitation, in front of power driven wheels 175 to add stability to base 120. The structure of chair 101 may be involved in the placement and function of outriggers 165. For example, without limitation, in some embodiments in which the wheel base of the chair is longer, the outriggers may be shorter or may be mounted closer to the front of the chair. Moreover, some of these embodiments may be implemented without safety wheels in the front, such as safety wheels 170. For example, without limitation, in one such embodiment the power driven wheels may be located with the leading edges in alignment with the front edge of the seat while the seat is in a raised position. The alignment in such an embodiment may eliminate the need for safety wheels since the center of gravity of the chair may be closer to the load to be lifted and the weight or counterbalance leverage of the chair to compensate for the load being lifted may be increased. In the present embodiment, outriggers 165 may be able to telescopically retract beneath base 120 and extend outward from base 120. This extending and retracting function may be operated by powered actuators. Outriggers 165 may be located in such a position to typically avoid contact with the feet or legs of an individual seated in chair 101 while being extended. It is contemplated that, when fully extended, outriggers 165 may not exceed the width of the wheels of chair 101 to typically enable outriggers 165 to be used in a limited space such as, but not limited to, a hallway or a doorway into a room. The movement of outriggers 165 may be controlled by a computer or similar device to typically insure that outriggers 165 are employed as needed to lift the load safely. Removing outriggers 165 or to retracting outriggers 165 while hoist 105 in use may render the lifting functions of chair 101 unsafe and may restrict the overall mobility capabilities of chair 101. The contact points between outriggers 165 and the floor or supporting surface may comprise a coating or pad that may help prevent damage to the floor. These pads or coatings may also serve to protect outriggers 165 from damage if used on an abrasive surface, such as but not limited to, gravel or concrete. In some embodiments, these pads or coatings may be of larger diameter than the actual surface of outriggers 165 which may enable outriggers 165 to support a load being lifted on a soft surface such as, but not limited to, dirt or grass. In addition the pads or coatings in some embodiments may be made of a non-stick type material similar to Teflon™ to help enable chair 101 to be moved short distances while outriggers 165 are extended, for example, without limitation, backing outward from lifting a patient from a bed to increase the distance available for the patient to stand by the edge of the bed or moving chair 101 closer to a bed as a patient is being placed into the bed. In some embodiments outriggers 165 may comprise leveling jacks which may adjust the connection points between outriggers 165 and chair 101 or outriggers 165 and the floor to help level chair 101 on uneven surfaces. Some embodiments may comprise an actuator at the mounting point of outriggers 165 at the front or rear of chair 101 that may be able to adjust the relationship of chair 101 to outriggers 165 to compensate for a surface that is not level. This actuator may also enable outriggers 165 to be fully extended prior to coming in contact with the floor. It is contemplated that the actuator or actuators controlling the extension and angle of outriggers 165 may be controlled by a computer or similar device to typically ensure that outriggers 165 are employed properly to stabilize the chair 101. Outriggers 165 may be positioned close enough to the floor to typically enable outriggers 165 to be placed under a bed or similar object from which an individual may be lifted. In some embodiments, such as, but not limited to, the embodiment illustrated by way of example in FIGS. 3A and 3B, additional outriggers may be placed on both sides of the chair to help prevent the chair from tipping to either side.

In the present embodiment, chair 101 and its various powered functions may be operated by pushing buttons or activating other types of controls on a control panel located on chair 101. Those skilled in the art will readily recognize, in light of and in accordance with the teachings of the present invention, that this control panel may comprise a multiplicity of suitable types of controls such as, but not limited to a joystick for guiding the movement of chair 101, levers or toggles for changing the incline of back 110, or dials for raising and lowering seat 115 or hoist 105. Furthermore, in some applications a remote controller, which may be wired to chair 101 or wireless may be used to control the various functions of chair 101. It is contemplated that these powered functions may be controlled by electronic controllers which receive input from sensors and switches so the functions may be monitored to typically avoid unsafe operations. In the present embodiment, the powered functions may be operated by a caregiver or, if the abilities of the individual being moved by chair 101 allows them control, may be operated by this individual. Braking and parking functions may be controlled by the powered motors of chair 101. In some embodiments mechanical brakes such as, but not limited to, wheel locks may be used in conjunction with the powered braking and parking functions. When the motors are not powered it is typically very difficult to move chair 101, but these motors can be disengaged by a lever, which may suspend the control for parking or braking. Therefore, when a patient is in chair 101 this disengagement typically should not be performed, unless there is an extreme emergency and there are multiple individuals available to secure the movement of chair 101.

In typical use of the present embodiment, chair 101 may be used to move an individual from one place to another place without the effort of walking. The movement of the individual may include transferring the individual into or out of chair 101 as well as travelling from place to place while sitting in chair 101 similar to a traditional powered wheelchair. To transfer an individual from one location to another, hoist 105 may be positioned so that mast 125 may be capable to reach approximately 7 and ½ feet in height at a point approximately 1 and ½ feet to 2 feet in front of raised back 110. This may enable sling 145 to rotate 180 degrees without hitting the raised back 110 and may enable the components of hoist 105 to lift sling 145 and the individual being lifted high enough to clear the floor. Being able to rotate 180 degrees in front of chair 101 may enable the individual to transition from a bed or other location into chair 101 or to transition from chair 101 to sit on a bed, to sit on another chair, to sit on a toilet, to get into a bath tub. Some alternate embodiments may be implemented with various different mast heights and lengths to accommodate for a variety of factors such as, but not limitation, the overall size of the chair, the size of the patient, and the type of lifting being done. To transfer an individual from a bed to chair 101, outriggers 165 may be extended so that they reach under the bed. Outriggers 165 might not need to be employed as an individual is being placed into a tub, into another chair, or on a commode. Most commodes have a narrow base which outriggers 165 may typically be able to straddle, and in these cases it is advisable to use outriggers 165. However, some commodes may have bases which may interfere with operation of the outriggers. Furthermore, bath tubs or other chairs such as, but not limited to, recliners may interfere with the operation of outriggers as well. In these cases chair 101 may be placed very close to the object and monitoring devices examining the positioning of chair 101 may be employed to typically ensure a safe transfer without the use of outriggers 165. Once chair 101 is in place, the individual may be positioned at the edge of the bed and horizontal members 155 of sling 145 may be positioned under the individual's armpits. If safety straps are included on sling 145, these straps may be employed to secure the individual to sling 145. Then the individual or a caregiver may operate winch 140 to raise sling 145 along with the attached individual until the individual is raised above the floor. The individual or caregiver may then rotate the individual to the appropriate location to be positioned against raised back 110 and seat 115, and strap 160 may then be fastened. The individual or caregiver may then use the controls to lower seat 115 and back 110 to sit down in chair 101. Outriggers 165 may then be retracted under base 120, and sling 145 may be disconnected from the individual and stowed in a position provided on back 110. The individual or caregiver may then use chair 101 to transport the individual to the desired location. If the individual is being transferred from chair 101 to another place, for example, without limitation, into another chair, the process is similar. The individual may be attached to sling 145 by placing the horizontal members 155 under the individual's armpits and attaching any safety straps to secure the patient while seated in chair 101. Then seat 115 and back 110, along with hoist 105, may be raised so the individual is in a standing positioned. Strap 160 may be employed to hold the individual near seat 115 and back 110 while linkage 130 is raising these portions of chair 101. Strap 160 may then be released so winch 140 can be used to raise sling 145 and the attached individual to a height that will allow rotation even if the patient's feet are still on the on the floor or suspended above the floor. Then the individual may be rotated into position over a chair which is in front of chair 101 so winch 140 may be operated to lower the individual into this chair in front of chair 101. Once the individual is in place, sling 145 may be removed from the individual and returned to its storage position in back 110 of chair 101. If the individual is being lifted from a bed, the end of mast 125 may be extended to be able to reach near the center of the bed. Once positioned, sling 145 may be lowered down to the surface of the bed and placed under the individual so that horizontal members 155 may be located under the shoulders and under the armpits of the individual. Then a safety strap that is attached to sling 145 may be employed to secure the individual to sling 145. The individual may be lifted from a lying position into a seated position by raising sling 145 with winch line 135 and winch 140. In this seated position hinge 150 may enable horizontal members 155 to move inward to apply pressure to the ribcage of the individual. In some embodiments, such as but not limited to the embodiment illustrated by way of example in FIGS. 2A through 2C, this inward pressure may be controlled by adjusting the tension of the hinge. The individual may then be lifted enough to be located at the edge of the bed where the feet can be off the edge of the bed. Chair 101 may continue to lift the individual into a standing position in front of chair 101. Then the individual may rotate himself or may be rotated with the help of a caregiver to face away from chair 101. The individual may be lowered into seat 115 as chair 101 is returned into a lowered position. Placing the individual back into the bed may be accomplished by reversing these steps. These capabilities would serve to almost completely eliminate the stress normally incurred by a caregiver while moving an individual.

It is believed that many benefits may be obtained by some embodiments of the present invention. For example, without limitation, many embodiments may be operated by a single individual, even the individual being moved with the aid of a remote controller. Some embodiments may be implemented to traverse terrain that would be nearly impossible for conventional power lifts and may be as mobile as many power chairs currently available. In some applications a chair similar to chair 101 described in the foregoing may be able to replace overhead rail systems in homes, hospitals, and other patient care facilities. Many embodiments may help to reduce caregiver injuries which may be caused by strenuous activities involved in moving patients. Furthermore, it is believed that an individual may typically be suspended by the sling for a short period of time when being lifted by a device similar to chair 101.

In another exemplary use of the present embodiment, chair 101 may also be used for retrieval of patients who have fallen. In this application winch 140 may be operated to lower sling 145 to floor level. Outriggers 165 may or may not be extended depending on the positioning of the individual as chair 101 may need to be close to the individual. Sling 145 may then be placed under the shoulders of the individual to start the lifting process. As the upper torso of the individual is lifted, sling 145 may be rotated into position under the armpits and chair 101 may be moved to center the individual under mast 125. Winch 140 may then continue to lift the individual until the individual is raised from the floor. If not already extended, as the individual is being lifted and weight is being transferred to chair 101, outriggers 165 may be employed to help ensure stability. In yet another exemplary use, chair 101 may be used to hold an individual in a lifted position while being dressed as this position may provide freedom from obstructions to dress the lower portion of the individual. Then even if the individual is very weak, seat belt strap 160 may be employed to hold the individual to seat 115 and back 110 in an upright position so that sling 145 may be loosened enough to be of little obstruction for dressing the upper torso. In many cases the upper torso may be dressed prior to or after being lifted to dress the lower portion of the individual.

In yet another exemplary use, sling 145 may be disconnected from hoist 105 so that hoist 105 may be used to lift objects that may be too heavy for an individual to lift such as, but not limited to, furniture, bags of supplies, and laundry. These objects may then be lowered into seat 115 to be transferred to another location. For example, without limitation, this application may be used to move groceries from a vehicle into a kitchen.

Figure 2A:
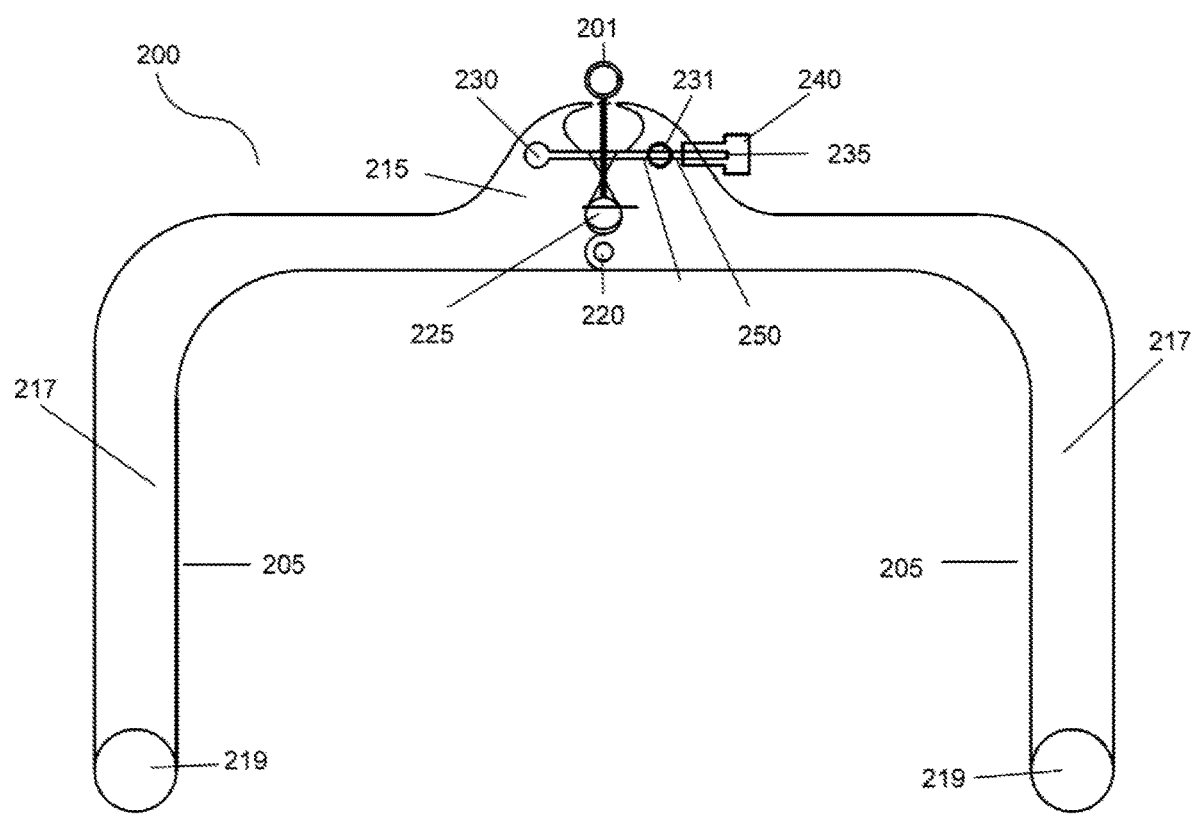
FIGS. 2A, 2B, 2C and 2D illustrate an exemplary sling for a patient hoist, in accordance with an embodiment of the present invention.
Figure 2B:
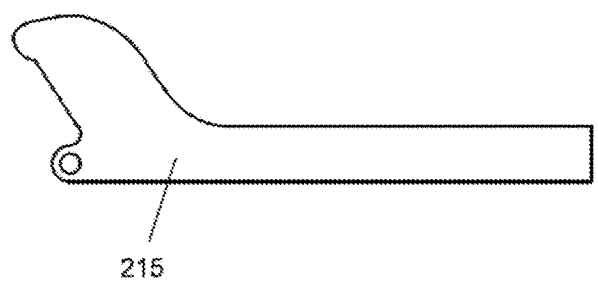
Figures 2C, 2D:
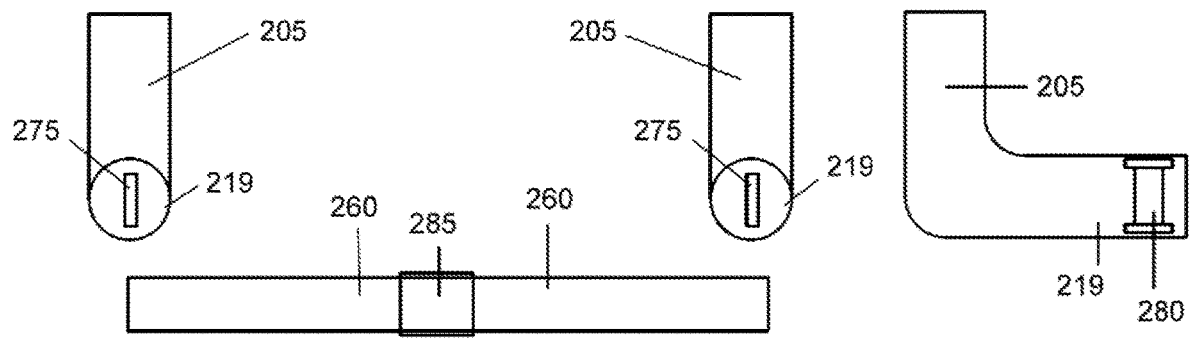

FIGS. 2A, 2B, 2C and 2D illustrate an exemplary sling 200 for a patient hoist, in accordance with an embodiment of the present invention. FIG. 2A is a transparent front view of sling 200. FIG. 2B is a diagrammatic front view of a cam plate 215. FIG. 2C is an exploded front view of a lower portion of sling 200 with a retractable safety strap 260, and FIG. 2D is a transparent side view of the lower portion of sling 200 with retractable safety strap 260. In the present embodiment, sling 200 is similar to sling 145, shown by way of example in FIG. 1, and sling 200 may be used in conjunction with a patient hoist connected to a motorized chair in a similar manner. Referring to FIGS. 2A and 2B, sling 200 comprises arms 205 connected by a pivot pin 220. Arms 205 may be formed as one piece structures comprising cam plates 215 and extended portions 217. At the end of each extended portion 217 may be a horizontal member 219. In typical use of the present embodiment, an individual may be lifted by sling 200 by hooking his armpits over horizontal members 219. Then the two cam plates 215, which face each other, may be moved by a lifting pin 225 as lifting pin 225 is lifted by a lifting eye 201. Bushings may be located on lifting pin 225 between lifting pin 225 and cam plates 215 to aid in this movement. When lifting pin 225 is lifted by lifting eye 201 the upper portions of cam plates 215 may be pulled apart while the lower portions of cam plates 215 may remain anchored by pivot pin 220. The pivoting action of cam plates 215 around pivot point 220 typically causes extended portions 217 of arms 205 to move inward to apply pressure to the ribcage of the attached individual. The amount of pressure applied to the individual may be controlled by a load adjuster attached to cam plates 215 at connection points 230 and 231. A threaded rod 235 extends from connection point 230 through a slip joint at connection point 231 and then to an adjustment knob 240. The outward movement of cam plates 215 pulls connection points 230 and 231 apart along threaded rod 235 until a seat 250 on connection point 231 reaches adjustment knob 240. This typically stops the movement of cam plates 215 and therefore stops the inward movement of extended portions 217 of arms 205.

Referring to FIGS. 2C and 2D, the ends of arms 205 of sling 200 may be bent at an angle of 90 degrees to form horizontal members 219 that may serve as the lifting points for an individual when placed under the armpits. Horizontal members 219 each comprise a slot 275 in the front and a spool 280 inside. Strap 260 may retract into horizontal members 219 through slots 275 and onto spools 280. Spools 280 may comprise spring loaded mechanisms that may enable strap 260 to more easily retract into horizontal members 219. Strap 260 may be formed as two portions, one for each arm 205, with one portion comprising a buckle assembly 285, which may enable the portions of strap 260 to be separated and reattached as needed. In typical use of the present embodiment, strap 260 may be used to secure the individual to the sling. The present embodiment may also provide easy access to and storage for straps 260. It is contemplated that alternate embodiments may be implemented with safety straps that do not retract back into the arms of the sling. In such embodiments the straps may be connected to the sling when needed by various different means such as, but not limited to, screws, bolts, clips, buckles, or channels. In other alternate embodiments patient slings may be employed without safety straps.

Figures 3A, 3B:
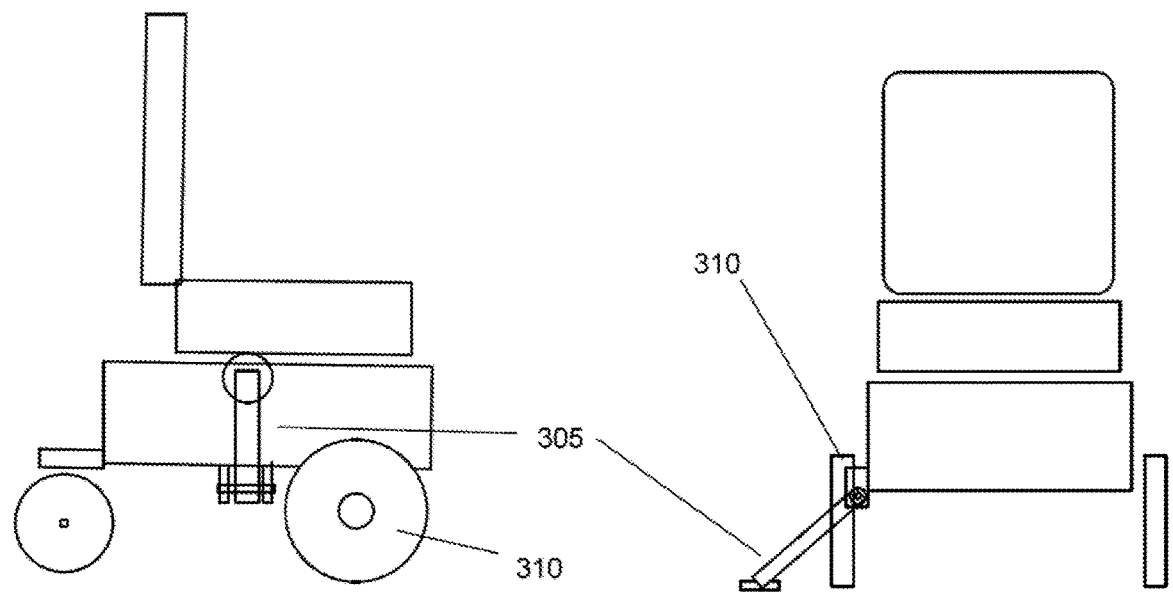
FIGS. 3A and 3B illustrate an exemplary motorized chair with a retractable outrigger attached to the side, in accordance with an embodiment of the present invention.

FIGS. 3A and 3B illustrate an exemplary motorized chair with a retractable outrigger 305 attached to the side, in accordance with an embodiment of the present invention. FIG. 3A is a diagrammatic side view, and FIG. 3B is a diagrammatic front view. In the present embodiment, outrigger 305 may be placed behind a powered wheel 310, which is similar to powered wheel 175 shown by way of example in FIG. 1. In some embodiments there may be one such outrigger on each side of the chair. Such outriggers may be employed as needed to help ensure that the chair does not tip to either side if lifting an individual on an uneven surface. In the present embodiment, outrigger 305 may be hinged to be retracted when not in use as illustrated by way of example in FIG. 3A.

Figure 4:
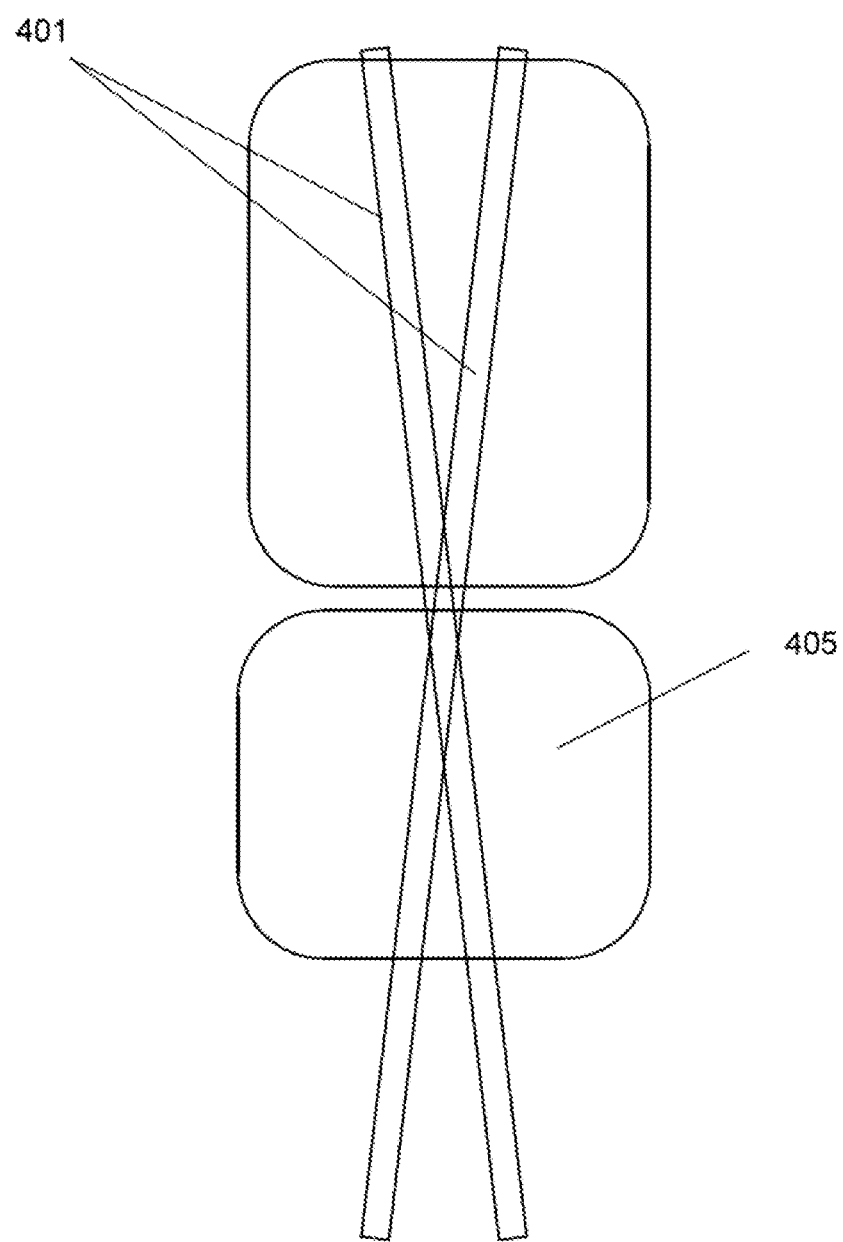
FIG. 4 is a diagrammatic front view of an exemplary strap system, in accordance with an embodiment of the present invention.
Figure 5:
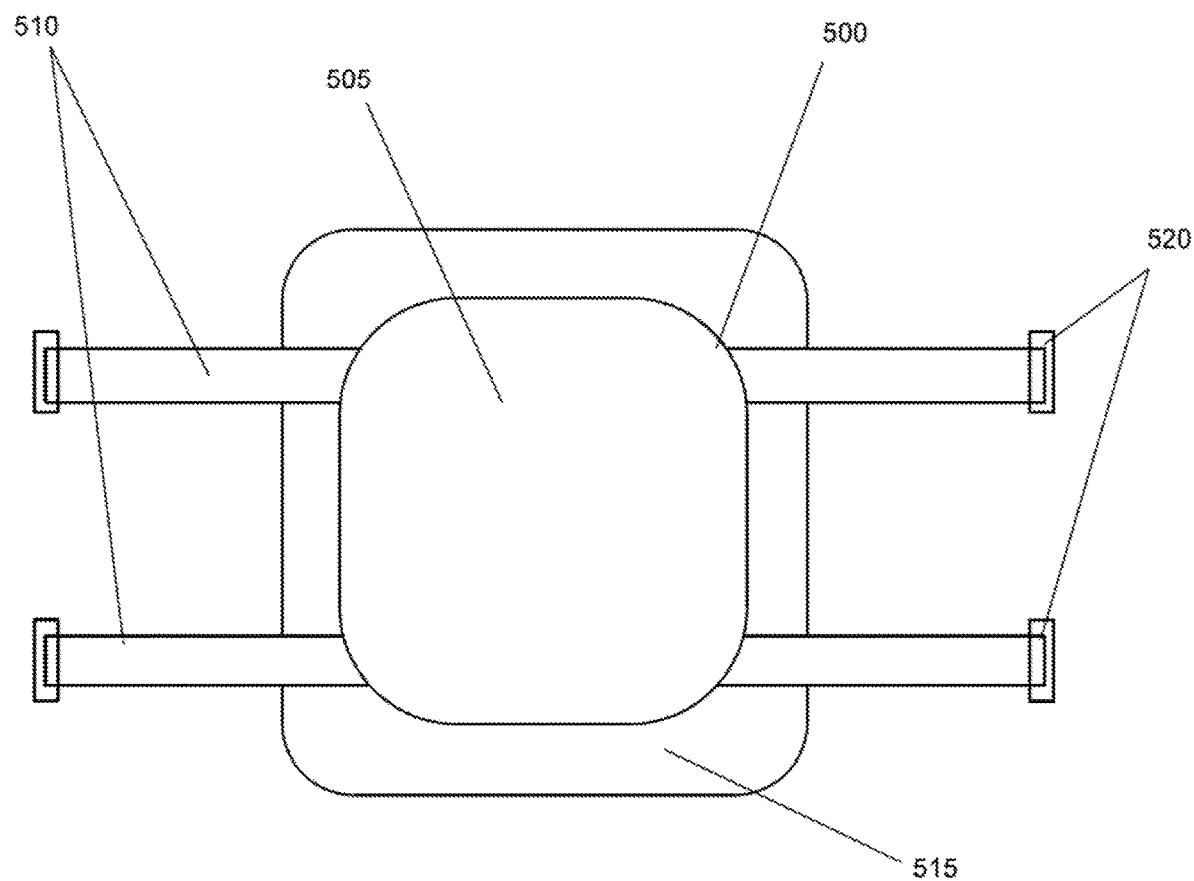
FIG. 5 is a diagrammatic top view of an exemplary sling attachment that may be used with a patient sling, in accordance with an embodiment of the present invention.

FIG. 4 is a diagrammatic front view of an exemplary strap system 401, in accordance with an embodiment of the present invention. In the present embodiment, strap system 401 may be arranged in an X configuration but are not limited to the X configuration and may be used under a patient in a seat 405, similar to seat 115 shown by way of example in FIG. 1, and in conjunction with a sling similar to sling 145 and sling 200 described by way of example in the foregoing to serve as a lifting device similar to safety straps required by OSHA as safety equipment. The straps of strap system 401 may attach to the arms of the sling and may be adjustable in length. Straps 401 and other such straps may be an accessory to a motorized chair with a patient hoist and may not be attached to the chair until needed to provide lifting for a patient. FIG. 5 is a diagrammatic top view of an exemplary sling attachment 500 that may be used with a patient sling, in accordance with an embodiment of the present invention. In the present embodiment, sling attachment 500 may be configured similar to an H pattern with a wide center connector 505 and four straps 510 attached to center connector 505. Center connector 505 may be placed into a seat 515 of a chair prior to a patient entering the chair.

Center connector 505 may be nearly as wide as seat 515 is deep with two straps 510 available on each side of the patient. In addition, center connector 505 may be padded to increase the comfort of the patient. Straps 510 may attach to the horizontal members of a patient sling. Then the patient may be lifted by the sling, which may be attached to a hoist incorporated into a motorized chair, with much of his weight sitting on center connector 505 of sling attachment 500. Since sling attachment 500 typically enables the patient to be lifted in a sitting position, the weight placed on the armpits or shoulders of the patient may be reduced. It is believed that this may be beneficial for patients who have had shoulder injuries. Sling attachment 500 may be provided as an optional accessory for a motorized chair with an incorporated patient hoist and may not necessarily be attached to the sling when not in use. Several different methods may be used to attach straps 510 to the horizontal portions of the sling. For example, without limitation, straps 510 are shown with buckles or latching devices 520 that may connect straps 510 to the sling. Other methods that may be used to attach straps 510 to a sling may include, without limitation, hooks, clips, or clamps.

It is contemplated that some embodiments of the present invention may be implemented as an accessory that may be added to an existing motorized or manual wheelchair to provide lifting functions. These embodiments may be made available as an aftermarket modification or as removable or permanent accessories. It is further contemplated that various additional features and functions may be implemented into some alternate embodiments such as, but not limited to, telescoping masts, the ability to adjust the angle of the mast, hand grips in various locations, adjustable arm rests, adjustable head rests, a control module or remote which overrides any patient accessible controls for the chair or lift, straps or restraints located in different locations to serve for particular patients or purposes, and/or dimensions or weight capacities altered from the original concepts to serve for special needs of some patients.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing a mobility aiding chair with an integrated patient hoist according to the present invention will be apparent to those skilled in the art. Various aspects of the invention have been described above by way of illustration, and the specific embodiments disclosed are not intended to limit the invention to the particular forms disclosed. The particular implementation of the chair with integrated patient hoist may vary depending upon the particular context or application. By way of example, and not limitation, the chairs described in the foregoing were principally directed to motorized implementations; however, similar techniques may instead be applied to integrating power or manual hoists into non-motorized wheelchairs, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system comprising:
    a base section, said base section is configured to provide a base for supporting engagements, attachments or load stresses on said system;
    a mobility wheel assembly that is configured to provide mobility to said base section;
    a safety wheel assembly, said safety wheel assembly comprises at least two safety wheels that are configured to provide stability to said base section;
    a seat implement operatively connected to said base section;
    a back implement operatively connected to said base section;
    a linkage mechanism, wherein said linkage mechanism is configured to be operable for raising or lowering at least one of said seat implement and back implement into a proximate vertical position or backward and forward reclining position, wherein said linkage mechanism comprises a first parallel bar implement;
    a sling implement, said sling implement comprises at least two bent ends, wherein said sling implement is configured to be operable for supporting an occupant, an individual, a patient, a system user, an object, an article, or an item;
    a safety strap, said safety strap comprises a retractable safety strap that is configured to secure the occupant, individual, patient, system user, object, article, or item to said sling implement;
    a hoist contrivance, said hoist contrivance operatively engaging said sling implement, wherein said hoist contrivance is configured to be operable for lifting the occupant, individual, patient, system user, object, article, or item;
    an actuator device, said actuator device is configured to be operable for raising or lowering at least one of said seat implement and back implement into said proximate vertical position or backward and forward reclining position, wherein said actuator device is operatively connected to said first parallel bar implement to raise or lower at least one of said seat implement and back implement into said proximate vertical position; and
    an outrigger device, said outrigger device comprises at least two or more outrigger arms, wherein said outrigger device is configured to at least one of, extend and retract, wherein each of said outrigger arms, in an extended position, are operable for preventing said system from tipping over.

2. The system of claim 1, in which said linkage mechanism further comprises a second parallel bar, said, second parallel bar is operatively connected to said actuator device, and wherein said first parallel bar is configured to tilt said back implement into at least one of said forward and backward reclining position.

3. The system of claim 2, in which said hoist contrivance comprises a winch line operatively connected to said sling implement, wherein said winch line is configured to raise or lower said sling implement.

4. The system of claim 3, in which said hoist contrivance further comprises a winch device, wherein said winch device is configured to pull or release said winch line attached to said sling implement to raise or lower said sling implement.

5. The system of claim 1, in which said hoist contrivance further comprising a mast portion that is configured to extend or retract said sling implement.

6. The system of claim 1, wherein said at least two or more outrigger arms are configured to extend from said base section during an activation of said hoist contrivance.

7. The system of claim 6, wherein said at least two or more outrigger arms are configured to extend from a bottom portion of said base section and retract into said base station.

8. The system of claim 1, wherein said bent ends are further comprised of horizontal members, wherein said retractable safety strap is configured to engage one of said horizontal members and be pulled from a retracted position to attach to the other of said horizontal members.

9. The system of claim 1, further comprising at least one level sensor.

10. The system of claim 1, wherein said hoist contrivance is hingedly connected to a bottom portion of said seat implement through said first parallel bar.

11. A system comprising:
    means for supporting an engagement, an attachment, or load stresses on said system;
    means for providing mobility to said supporting means;
    means for providing stability to said supporting means;
    a seat;
    a back rest;

means for raising or lowering at least one of said back rest and said seat, wherein said raising or lowering means is comprised of a bar and an actuator device, wherein said bar is substantially parallel to a base of the seat, wherein said actuator is operatively connected to said bar;

means for lifting an occupant, individual, a patient, a system user, a cargo, an object, an article, or an item;

means for attaching the occupant, individual, patient, system user, cargo, object, article, or item;

means for securing the occupant, individual, patient, system user, cargo, object, article, or item to said lifting means or seat providing means; and means for preventing said system from tipping.

12. The system of claim 11, further comprising means for warning of unsafe operation.

13. The system of claim 12, further comprising means for providing power to said system.

14. The system of claim 11, wherein said lifting means is comprised of a hoist contrivance, wherein said hoist contrivance is hingedly connected to a bottom portion of said seat through said bar.

15. A system comprising:
a base section, said base section is configured to provide a base for supporting an engagement, an attachment or load stresses on said system;
a mobility wheel assembly that is configured to provide mobility to said base section;
a safety wheel assembly, said safety wheel assembly comprises at least two safety wheels that are configured to provide stability to said base section;
a seat implement operatively connected to said base section;
a back implement operatively connected to said base section;
a linkage mechanism, said linkage mechanism is configured to be operable for raising or lowering at least one of said seat implement and back implement into a proximate vertical position or backward and forward reclining position;
a sling implement, said sling implement comprises at least two arm segments connected by a pivot pin, wherein said at least two arm segments are configured to move inwards, and wherein said sling implement is configured to be operable for attaching to an occupant, an individual, a patient, a system user, an object, an article, or an item;
a safety strap, said safety strap is a retractable safety strap that is configured to secure the occupant, individual, patient, system user, object, article, or item to said sling implement;
a hoist contrivance, said hoist contrivance operatively engaging said sling implement, wherein said hoist contrivance is configured to be operable for lifting the occupant, individual, patient, system user, object, article, or item;
an actuator device, said actuator device is configured to be operable for raising or lowering at least one of said seat implement and back implement into said proximate vertical position or backward and forward reclining position; and
an outrigger device, said outrigger device comprises at least two or more outrigger arms, wherein said outrigger device is configured to at least one of, extend and retract, wherein each of said outrigger arms, in an extended position, are operable for preventing said system from tipping over.

16. The system of claim 15, further comprising at least one level sensor.

17. The system of claim 16, which said sling implement further comprises a lifting pin operatively connected to a lifting eye.

18. The system of claim 17, further comprising a winch line operatively connected to said lifting eye, wherein raising said winch line moves said least two arm segments inwards.

19. The system of claim 18, in which each of said least two arm segments comprises bent ends to form horizontal members.

20. The system of claim 15, wherein said hoist contrivance is hingedly connected to a bottom portion of said seat implement.

* * * * *